(12) United States Patent
Brubak et al.

(10) Patent No.: US 12,547,551 B2
(45) Date of Patent: Feb. 10, 2026

(54) ONE-TIME PROGRAMMABLE CONTROL FOR MEMORY SUBSYSTEM

(71) Applicant: TEXAS INSTRUMENTS INCORPORATED, Dallas, TX (US)

(72) Inventors: Sverre Brubak, Oslo (NO); Ruchi Shankar, Bengaluru (IN); Praveen Kumar N, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 22 days.

(21) Appl. No.: 18/394,629

(22) Filed: Dec. 22, 2023

(65) Prior Publication Data

US 2025/0045208 A1    Feb. 6, 2025

Related U.S. Application Data

(60) Provisional application No. 63/517,372, filed on Aug. 3, 2023.

(51) Int. Cl.
*G06F 12/14* (2006.01)

(52) U.S. Cl.
CPC ................ *G06F 12/1408* (2013.01)

(58) Field of Classification Search
CPC .................................................. G06F 12/1408
See application file for complete search history.

(56) References Cited

U.S. PATENT DOCUMENTS

| | | | |
|---|---|---|---|
| 9,317,449 B2 * | 4/2016 | Ducharme | H04L 9/0822 |
| 9,843,675 B2 * | 12/2017 | Manabe | H04W 64/00 |
| 11,704,254 B2 * | 7/2023 | Szubbocsev | G06F 12/1408 |
| | | | 713/190 |
| 2007/0223266 A1 * | 9/2007 | Chen | G11C 29/52 |
| | | | 365/201 |
| 2009/0198871 A1 * | 8/2009 | Tzeng | G06F 12/0246 |
| | | | 711/E12.008 |
| 2009/0228663 A1 * | 9/2009 | Ichino | G06F 13/1663 |
| | | | 711/E12.066 |
| 2010/0313056 A1 * | 12/2010 | Margolis | G06F 21/57 |
| | | | 713/400 |
| 2019/0394170 A1 * | 12/2019 | Shameli-Sendi | H04L 63/0263 |
| 2021/0182209 A1 * | 6/2021 | Liang | G06F 3/0622 |
| 2025/0045208 A1 * | 2/2025 | Brubak | G06F 21/79 |

\* cited by examiner

*Primary Examiner* — Simon P Kanaan
(74) *Attorney, Agent, or Firm* — Michelle F. Murray; Frank D. Cimino (57) ABSTRACT

An apparatus includes: a hardware security module; a processor; a memory subsystem; and a controller. The memory subsystem includes a write interface and a memory. The memory includes a first region that is a one-time programmable (OTP) region, and a second region that is a shared region. The controller is between the hardware security module, the processor, and the memory subsystem. The controller is configured to: receive an OTP write request from the hardware security module; inhibit the providing of shared memory operations by the processor responsive to the OTP write request and an acknowledgment from the processor; cause OTP data related to the OTP write request to be written to the first region of the memory; clear storage of the write interface after writing the OTP data is complete; and cease to inhibit the providing of shared memory operations after the storage of the write interface is cleared.

20 Claims, 4 Drawing Sheets

ONE-TIME PROGRAMMABLE CONTROL FOR MEMORY SUBSYSTEM

CROSS REFERENCE TO RELATED APPLICATION

The present application claims priority to U.S. Provisional Application No. 63/517,372, titled "SECURE ONE-TIME PROGRAMMABLE MEMORY CONTROLLER ARCHITECTURE", filed on Aug. 3, 2023, which is hereby incorporated by reference in its entirety.

BACKGROUND

Microcontrollers, including but not limited to those intended for security applications, may use one-time programmable (OTP) memories to store sensitive data. In one conventional example, OTP memories are dedicated blocks of hardware with their own logic to enable field programming and security. These OTP features add cost and reduce portability. In another conventional example, a security module without OTP memory uses encryption to store sensitive data. However, this type of system is susceptible to replay attack (firmware images rolled back) and has limitations regarding encrypted data verification and support for different types of applications.

SUMMARY

In an example, an apparatus includes: a hardware security module; a processor; a memory subsystem; and a controller. The memory subsystem includes a write interface and memory. The write interface includes storage. The memory includes a first region and a second region. The first region is a one-time programmable (OTP) region. The second region is a shared region. The controller is between the hardware security module, the processor, and the memory subsystem. The controller is configured to: receive an OTP write request instruction from the hardware security module; inhibit the providing of shared memory operations by the processor responsive to the OTP write request instruction and an acknowledgement from the processor; cause OTP data related to the OTP write request instruction to be written to the first region of the memory; clear the storage of the write interface after writing the OTP data is complete; and cease to inhibit the providing of shared memory operations after the storage of the write interface is cleared.

In another example, a circuit includes a controller adapted to be coupled to a memory subsystem. The controller is configured to: receive a OTP write request; inhibit the providing of shared memory requests to the memory subsystem responsive to the OTP write request; cause OTP data related to the OTP write request to be provided to the memory subsystem; receive notification that the OTP data has been written to the memory subsystem; and cease to inhibit the providing of the shared memory requests to the memory subsystem responsive to the notification.

In yet another example, a method includes: receiving an OTP write request instruction via a first interface; inhibiting the providing of shared memory operations by a processor responsive to the OTP write request instruction and an acknowledgement from the processor; writing OTP data related to the OTP write request instruction to a first region of a memory via a second interface separate from the first interface; clearing storage of a write interface after writing OTP data is complete; and ceasing to inhibit the providing of shared memory operations after the storage of the write interface is cleared.

DETAILED DESCRIPTION

The same reference numbers or other reference designators are used in the drawings to designate the same or similar features. Such features may be the same or similar either by function and/or structure.

Described herein is a memory subsystem with a one-time programmable (OTP) region and a shared region. The memory subsystem is accessible for reads and writes via firewalls. In some examples, OTP write operations are managed by a controller. Example operations of the controller include: receive an OTP write request instruction from a hardware security module; inhibit the providing of shared memory operations by a processor responsive to the OTP write request instruction; write OTP data related to the OTP write request instruction to the OTP region of the memory subsystem; clear storage of the write interface after writing the OTP data is complete; and cease to inhibit the providing of shared memory operations after the storage of the write interface is cleared. In some examples, OTP read operations are performed via a parallel interface.

In some examples, the controller emulates OTP memory using shared flash memory by reusing existing flash controller hardware. In some examples, timing flexibility for system processors is supported, where the start of OTP write operations is adjustable to allow system processors to finish operations having a threshold priority. In some examples, system processor operations below the threshold priority are delayed until after OTP write operations are completed. In some examples, the controller ensures that the OTP region of the memory subsystem adheres to the security properties of confidentiality and immutability while avoiding CPU lockup during ongoing OTP operations.

With the controller and shared memory subsystem, the overall cost to provide OTP operations is reduced compared to using a separate OTP memory and/or duplicate logic. In some examples, the controller is integrated with standard interfaces and enables hardware reuse with available hardware security module options.

Figure 1:
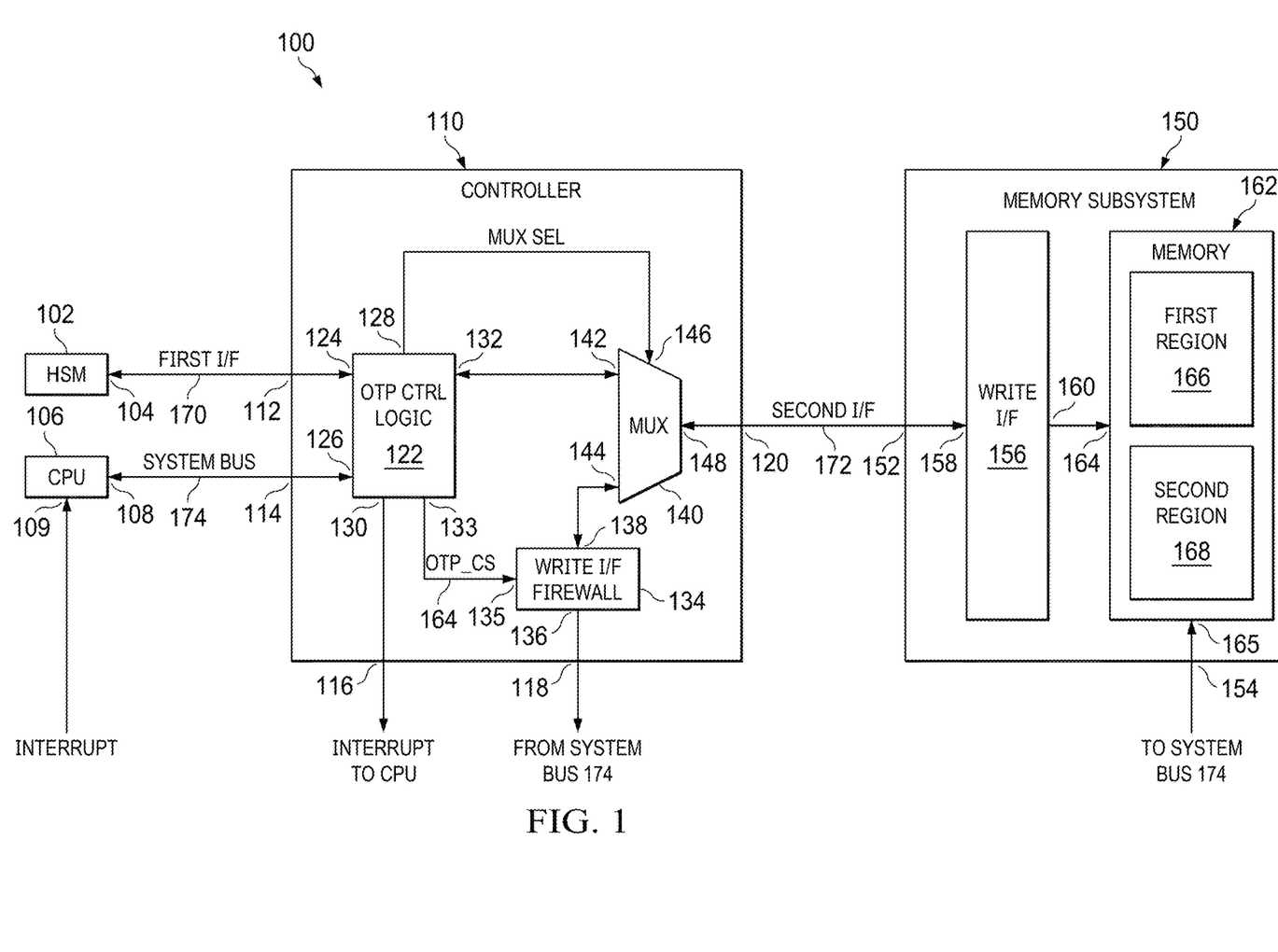
FIG. 1 is a diagram showing an example system.

FIG. 1 is a diagram showing an example system 100. As shown, the system 100 includes a hardware security module (HSM) 102, a processor (CPU) 106, a controller 110, a memory subsystem 150, a first interface 170, a second interface 172, and a system bus 174. The memory subsystem 150 includes write interface (I/F) 156 and memory 162. The memory 162 includes a first region 166 and a second region 168. In one example, the system 100 is a system-on-a-chip (SoC). In another example, the system 100 includes multiple integrated circuits (ICs). For example, the HSM 102, the processor 106, and the controller 110 may be components of a first IC, while the memory subsystem 150 is a component of a second IC.

In the example of FIG. 1, the HSM 102 has a terminal 104. The processor 106 has a first terminal 108 and a second terminal 109. The controller 110 has a first terminal 112, a second terminal 114, a third terminal 116, a fourth terminal 118, a fifth terminal 120. The memory subsystem 150 has a first terminal 152 and a second terminal 154. The write I/F 156 has first terminal 158 and a second terminal 160. The memory 162 has a first terminal 164 and a second terminal 165.

The terminal of the HSM 102 is coupled to the first terminal 112 of the controller 110. The first terminal 108 of the processor 106 is coupled to the second terminal 114 of the controller 110. The second terminal 109 of the processor 106 is coupled to the third terminal 116 of the controller 110. The fourth terminal 118 of the controller 110 is coupled to a system bus 174. The fifth terminal 120 of the controller 110 is coupled to the first terminal 152 of the memory subsystem 150 and to the first terminal 158 of the write I/F 156. The second terminal 160 of the write I/F 156 is coupled to the first terminal 164 of the memory 162. The second terminal 165 of the memory 162 is coupled to the second terminal 154 of the memory subsystem 150.

In the example of FIG. 1, the controller 110 includes an OTP control logic 122, a multiplexer 140, a write interface (I/F) firewall 134, and a multiplexer 140. The OTP control logic 122 has a first terminal 124, a second terminal 126, a third terminal 128, a fourth terminal 130, a fifth terminal 132, and a sixth terminal 133. In some examples, the OTP control logic 122 includes a finite state machine (FSM) with dedicated hardware to perform OTP operations. In some examples, the OTP control logic 122 includes a processor and a memory with OTP instructions for execution by the processor. When executed, the OTP instructions cause the processor of the OTP control logic 122 to perform OTP operations such as the example OTP operations described herein. The write I/F firewall 134 has a first terminal 135, a second terminal 136, and a third terminal 138. The multiplexer 140 has a first terminal 142, a second terminal 144, a third terminal 146, and a fourth terminal 148.

In some examples, the HSM 102 operates to: identify an OTP write trigger; provide an OTP write request instruction responsive to identifying the OTP write trigger, the OTP write request instruction provided to the controller 110; receive a first acknowledgement from the controller 110 responsive to providing the OTP write request instruction, the first acknowledgement indicating receipt of the OTP write request instruction; receive a second acknowledgement from the controller 110 responsive to providing the OTP write request instruction, the second acknowledgement indicating the controller 110 is ready for OTP write operations; and provide OTP data related to the OTP write request instruction to the controller 110. The operations of the HSM 102 involve sending and receiving instructions that include data and/or signals via the first interface 170 between the HSM 102 and the controller 110. In some examples, instructions provided from the HSM 102 to the controller 110 are sent from the terminal 104 of the HSM 102 to the first terminal 112 of the controller 110. Also, instructions provided from the controller 110 to the HSM 102 are sent from the first terminal 112 of the controller 110 to the terminal 104 of the HSM 102. In other examples, the HSM 102 and the controller 110 may include other terminals related to the first interface 170.

The processor 106 operates to: perform processing operations based on instructions and/or data stored by the memory subsystem 150; receive a first interrupt instruction from the controller 110; provide a first acknowledgement to the controller 110 responsive to the first interrupt instruction, the first acknowledgement indicating receipt of the first interrupt instruction; provide a second acknowledgement to the controller 110 responsive to the first interrupt instruction, the second acknowledgement indicating the processor 106 is in a standby state. During the standby state, the processor 106 does not perform reads and writes to the memory subsystem 150. During OTP writes (e.g., while the processing is in the standby state), the content and location of the OTP writes are not visible to the processor 106.

The controller 110 operates to: receive an OTP write request instruction from the HSM 102; provide an acknowledgment to the HSM 102 responsive to the OTP write request instruction; provide a first interrupt instruction to the processor 106 responsive to the OTP write request instruction; receive a first acknowledgement from the processor 106 responsive to the first interrupt instruction, the first acknowledgement indicating the processor 106 received the first interrupt instruction; receive a second acknowledgement from the processor 106 responsive to the first interrupt instruction, the second acknowledgement indicating the processor 106 is in a standby state; provide a notification to the HSM 102, the notification indicating the controller 110 is ready for OTP write operations; receive OTP data from the HSM 102 via the first interface 170 responsive to the notification; provide the OTP data to the memory subsystem 150 via the second interface 172; clear storage of the write I/F 156 after OTP write operations are completed; and provide a second interrupt instruction to the processor 106, the second interrupt instruction indicating shared memory operations are available.

More specifically, the OTP control logic 122 of the controller 110 operates to: receive an OTP write request instruction from the HSM 102 at the first terminal 124; provide an acknowledgment for the HSM 102 at the first terminal 124 responsive to the OTP write request instruction; provide a control signal (OTP_CS) at the sixth terminal 133 responsive to the OTP write request instruction. In some examples, OTP_CS provide an identifier and mode information to the write I/F firewall 134, where the identifier controls OTP write access of the write I/F firewall 134. In some examples, the write I/F firewall 134 monitors write access attempts to the memory subsystem 150 from the system bus 174 and blocks any attempt to trigger programming to the first region 166 of the memory 162 of the memory subsystem 150.

The OTP control logic 122 of the controller 110 also operates to: provide a first interrupt instruction for the processor 106 at the fourth terminal 130 responsive to the OTP write request instruction; receive a first acknowledgement from the processor 106 at the second terminal 126 responsive to the first interrupt instruction, the first acknowledgement indicating the processor 106 received the first interrupt instruction; receive a second acknowledgement from the processor 106 at the second terminal 126 responsive to the first interrupt instruction, the second acknowledgement indicating the processor 106 is in a standby state; provide a notification at the first terminal 124 for the HSM 102, the notification indicating the controller 110 is ready for OTP write operations; receive OTP data from the HSM 102 at the first terminal 124 via the first interface 170 responsive to the notification; provide a multiplexer control signal (MUX SEL) at the third terminal 128 responsive to receiving the OTP data; and provide the OTP data to the fifth terminal 132 after MUX SEL is provided to the third terminal 128.

The write I/F firewall 134 operates to: receive OTP_CS at the first terminal 135; receive write requests and/or write data at the second terminal 136; and provide each write request and/or write data at the third terminal 138 responsive to an identifier provided with the respective write request and/or write data and the current mode of the controller 110. The mode options include an OTP mode and a shared memory mode.

The multiplexer 140 operates to: receive OTP data at the first terminal 142; receive other data at the second terminal 144; receive MUX_SEL at the third terminal 146; and provide the OTP data or the other data at the fourth terminal 148 responsive to MUX_SEL.

The memory subsystem 150 operates to: receive the OTP data or the other data at the first terminal 152. If OTP data is received, the write I/F 156 writes the OTP data to the first memory region 166 of the memory 162, then clears storage of the write I/F 156 used to write the OTP data. If other data is received, the write I/F 156 writes the other data to the second memory region 168 of the memory 162. The memory subsystem 150 may also operate to: receive a read request at the second terminal 154. If the read request corresponds to OTP data in the first region 166 of the memory 162, the memory subsystem 150 retrieves and provides the OTP data from the first region 166 of the memory 162 to the second terminal 154. If the read request corresponds to some of the other data in the second region 168 of the memory 162, the memory subsystem 150 retrieves and provides the requested data from the second region 168 of the memory 162 to the second terminal 154. In some examples, reads to the memory subsystem 150 are restricted using a read firewall (not shown in FIG. 1) between the system bus 174 and the second terminal 154 of the memory subsystem 150. In such examples, the read firewall restricts reads to the first memory region 166 of the memory 162 to a particular component (e.g., HSM 102) based on a component identifier and/or another protection scheme.

Figure 2:
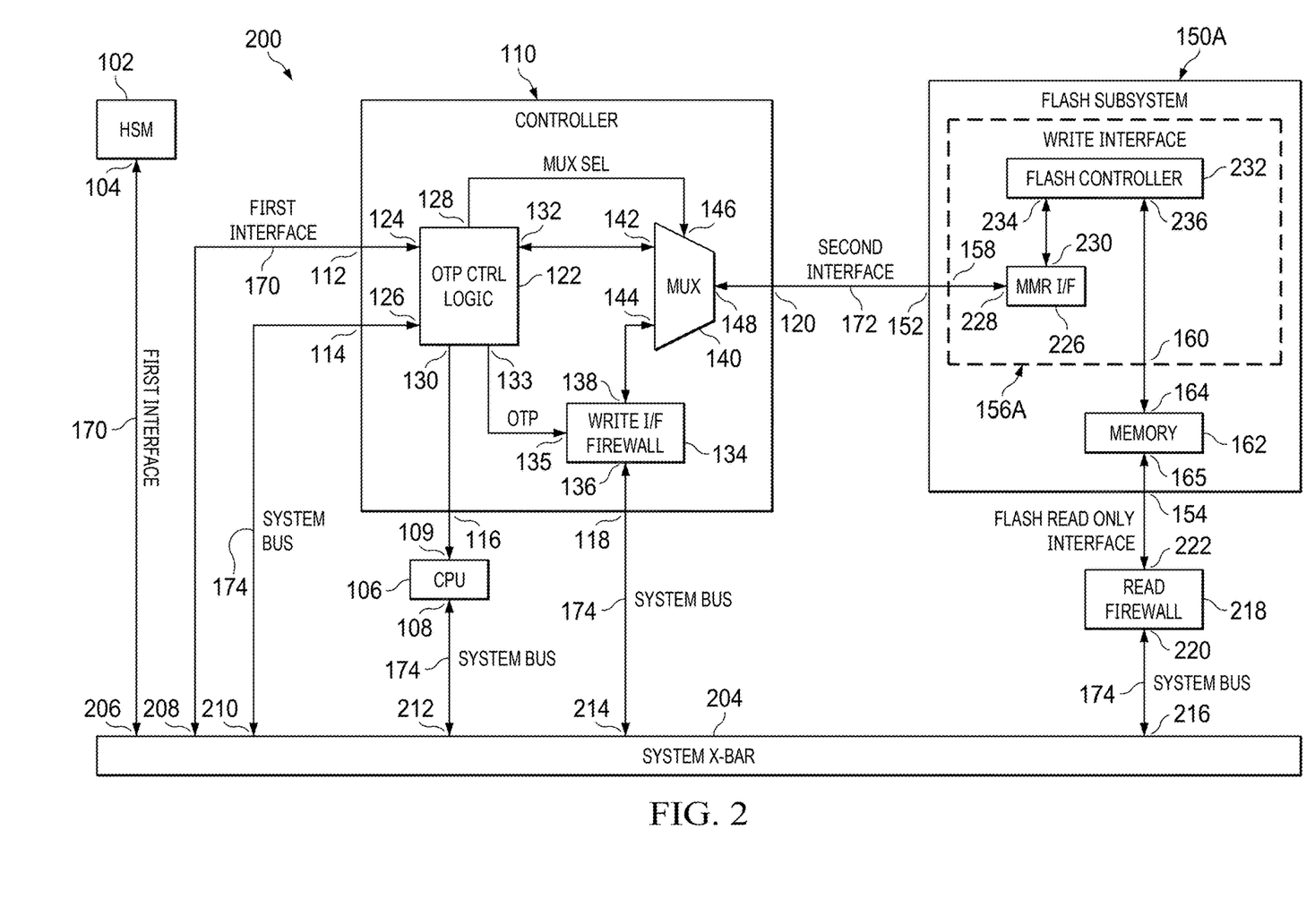
FIG. 2 is a diagram showing another example system.

FIG. 2 is a diagram showing another example system 200. As shown, the system 200 includes the HSM 102, the processor 106, the controller 110, a flash subsystem 150A, the first interface 170, the second interface 172, the system bus 174, a system crossbar 204, and a read firewall 218. The flash subsystem 150A is an example of the memory subsystem 150 in FIG. 1. In one example, the system 200 is a system-on-a-chip (SoC). In another example, the system 200 includes multiple ICs. For example, the HSM 102, the processor 106, and the controller 110A may be components of a first IC, while the flash subsystem 150A and the read firewall 218 are components of a second IC. If different ICs are used, an encrypted link and/or cryptographic credentials may be used to maintain security of OTP writes and subsequent reads.

In the example of FIG. 2, the HSM 102, processor 106, and the controller 110 have the terminals described in FIG. 1. The flash subsystem 150A has the terminals described for the memory subsystem 150 in FIG. 1. The read firewall 218 has a first terminal 220 and a second terminal 222. The system crossbar 204 has a first terminal 206, a second terminal 208, a third terminal 210, a fourth terminal 212, a fifth terminal 214, and a sixth terminal 216.

In the example of FIG. 2, the controller 110 includes the OTP control logic 122, the write I/F firewall 134, and the multiplexer 140 described in FIG. 1. The flash subsystem 150A includes a write interface 156A and the memory 162. The write interface 156A is an example of the write interface 156 in FIG. 1. In the example of FIG. 2, the write interface 156A includes a memory mapped register (MMR) I/F 226 and a flash controller 232. The MMR I/F 226 has a first terminal 228 and a second terminal 230. In some examples, the MMR I/F 226 includes a set of MMRs. The flash controller 232 has a first terminal 234 and a second terminal 236. The memory 238 has the terminals described in FIG. 1.

In the example of FIG. 2, the first terminal 206 of the system crossbar 204 is coupled to the terminal 104 of the HSM 102. The second terminal 208 of the system crossbar 204 is coupled to the first terminal 112 of the controller 110. The third terminal 210 of the system crossbar 204 is coupled to the second terminal 114 of the controller 110. The fourth terminal 212 of the system crossbar 204 is coupled to the first terminal 108 of the processor 106. The fifth terminal 214 of the system crossbar 204 is coupled to the fourth terminal 118 of the controller 110. The sixth terminal 216 of the system crossbar 204 is coupled to the first terminal 220 of the read firewall 218. The second terminal 222 of the read firewall 218 is coupled to the second terminal 154 of the flash subsystem 150A. The first terminal 228 of the MMR I/F 226 is coupled to the first terminal 158 of the write I/F 156, which is coupled to first terminal 152 of the flash subsystem 150A. The second terminal 230 of the MMR I/F 226 is coupled to the first terminal 234 of the flash controller 232. The second terminal 236 of the flash controller 232 is coupled to the first terminal 164 of the memory 162. The second terminal 165 of the memory 162 is coupled to the second terminal 154 of the flash subsystem 150A.

In some examples, the HSM 102, the processor 106, and the controller 110 perform the respective operations described in FIG. 1. The flash subsystem 150A performs the operations described for the memory subsystem 150 in FIG. 1. More specifically, the MMR I/F 226 of the write I/F 156A operates to store information for write operations. Example registers of the MMR I/F 226 may include: an address register, write data register(s), an enable register, a control command register, an execute register, and a status register. The address register stores the write location to be programmed. The write data register(s) store the write data to be programmed to the address. The enable register stores a byte mask of valid bytes in the write data. In some examples, only data bytes marked as valid can be written. The control command register stores a flash controller program command for write operations. The execute register stores an execute trigger that starts a write operation. The status register tracks the status of a write operation.

The flash controller 232 operates to: receive information for write operations from the MMR I/F 226; and perform write operations to the memory 162 based on the received information. The memory 162 operates to: write data to an address indicated by the flash controller 232; and read data at an address indicated by a read interface included with the memory 162 or flash subsystem 150A.

In the example of FIG. 2, the system crossbar 204 operates to selectively connect different ports or interfaces of the system 200 in a manner that minimizes switching latency and propagation delay. The read firewall 218 operates to manage reads to the flash subsystem 150A. In some examples, the read firewall 218 may allow reads for some regions (e.g., the second region 168 in FIG. 1) of the memory 162 without restriction, while other regions (e.g., the first region 166 in FIG. 1) of the memory 162 are restricted. In different examples, the read firewall 218 may allow reads to a restricted region of the memory 162 based on a correct component identifier being provided by the component requesting the read, an authentication process for the component requesting the read, and/or another restriction technique.

In some examples, the HSM 102 is plugged into a SoC that includes the other components described in FIG. 2. In such examples, OTP operations are implemented with minimal or no impact on the other functions of the SoC. In the example of FIG. 2, the controller 110 and the flash subsystem 150A emulate a secure OTP using a first region (e.g., the first region 166 in FIG. 1) of the memory 162. In some examples, the flash subsystem 150A includes a direct parallel interface for reads, while writes are controlled by the flash controller 232. In some examples, the flash controller 232 interacts with other components of the system 200 via the MMR I/F 226 and the second interface 172. In some examples, the MMR I/F 226 includes storage for: an address, write data, an enable indicator, a control command, an execute trigger, and a status indicator as described herein. In some examples, registers of the MMR I/F 226 are written in sequence via the second interface 172, and the controller 110 monitors for completion by polling the status register of the MMR I/F 226.

In some examples, the controller 110 converts a single write access on the first interface 170 to a programming sequence on the second interface 172. The first interface 170 may be, for example, an advanced high-performance bus (AHB) or an advanced peripheral bus (APB). The flash subsystem 150A is a shared resource, and in some examples, only a portion of the memory 162 is emulated as an OTP region. In such examples, the second interface 172 is not dedicated only to OTP writes. Programming access to the OTP region of the memory 162 may be blocked for system components, except the HSM 102, for security. In some examples, OTP address/data is confidential and the controller 110 may zero out the MMRs after an OTP write operation. In some examples, OTP write operations do not interfere with user applications. To avoid such interference, the controller 110 may generate interrupt instructions to the processor 106 indicating the start and the end of OTP write operations.

In some examples, an apparatus includes: an HSM (e.g., the HSM 102 in FIGS. 1 and 2); a processor (the processor 106 in FIGS. 1 and 2); a memory subsystem (e.g., the memory subsystem 150 in FIG. 1, or the flash subsystem 150A in FIG. 2); and a controller (e.g., the controller 110 in FIGS. 1 and 2). In some examples, the memory subsystem includes a write interface (e.g., the write interface 156 in FIGS. 1 and 2, or the related components in FIG. 2) and a memory (e.g., the memory 162 in FIGS. 1 and 2) having a first region (e.g., the first region 166 in FIG. 1) and a second region (e.g., the second region 168 in FIG. 1). The first region is an OTP region. The second region is a shared region. Each of the first region and the second region is defined by a respective address range of the memory 162. The controller is between the HSM, the processor, and the memory subsystem. In some examples, the controller is configured to: receive an OTP write request instruction from the hardware security module; inhibit the providing of shared memory operations by the processor responsive to the OTP write request instruction and an acknowledgement from the processor; cause OTP data related to the OTP write request instruction to be written to the first region of the memory; clear storage of the write interface after writing the OTP data is complete; and cease to inhibit the providing of shared memory operations after the storage of the write interface is cleared.

In some examples, the controller includes a write interface firewall (e.g., the write interface firewall 134 in FIGS. 1 and 2) between the processor and the memory subsystem. The write interface firewall is configured to inhibit the providing of shared memory requests by the processor to the write interface during an OTP interval. In some examples, the controller has a terminal (e.g., the fifth terminal 120 in FIGS. 1 and 2), OTP control logic (e.g., the OTP control logic 122 in FIGS. 1 and 2), and a multiplexer (e.g., the multiplexer 140 in FIGS. 1 and 2). The terminal is coupled to the memory subsystem. The multiplexer is configured to selectively forward data from the OTP control logic or the write interface firewall to the terminal.

In some examples, the apparatus includes a read firewall (e.g., the read firewall 218 in FIG. 2) between the processor and the memory subsystem. The read firewall is configured to prevent the processor from making reads to the first region of the memory. In some examples, the HSM is configured to initiate the OTP write request instruction responsive to a request from the processor. In some examples, the OTP data includes a cryptographic certificate or key. In some examples, the OTP data includes a monotonic count.

In some examples, the apparatus includes: a first interface (e.g., the first interface 170 in FIGS. 1 and 2); and a second interface (e.g., the second interface 172 in FIGS. 1 and 2). The first interface is between the hardware security module and the controller. The second interface is between the controller and the memory subsystem. The controller is configured to: receive the OTP data via the first interface using a first communication protocol; and provide the OTP data to the memory subsystem via the second interface using a second communication protocol different than the first communication protocol.

In some examples, the hardware security module, the processor, the memory subsystem, and the controller are components of a single integrated circuit. In other examples, the hardware security module, the processor, and the controller are components of a first integrated circuit, while the memory subsystem is a component of a second integrated circuit.

In some examples, a circuit includes a controller (e.g., the controller 110 in FIGS. 1 and 2) adapted to be coupled to a memory subsystem (e.g., the memory subsystem 150 in FIG. 1, or the flash subsystem 150A in FIG. 2). In such examples, the controller is configured to: receive a OTP write request; inhibit the providing of shared memory requests to the memory subsystem responsive to the OTP write request; cause OTP data related to the OTP write request to be provided to the memory subsystem; receive notification that the OTP data has been written to the memory subsystem; and cease to inhibit the providing of the shared memory requests to the memory subsystem responsive to the notification.

In some examples, the controller includes OTP control logic (e.g., the OTP control logic 122 in FIGS. 1 and 2) configured to: receive the OTP write request; generate a processor interrupt responsive to the OTP write request; receive an acknowledgement responsive to the processor interrupt; and generate a control signal (e.g., OTP_CS in FIGS. 1 and 2) responsive to the acknowledgement. In some examples, the controller includes a write I/F firewall (e.g., the write I/F firewall 134 in FIGS. 1 and 2) coupled to the OTP control logic. The write interface firewall is configured to: receive the control signal; and inhibit the providing of shared memory requests to the memory subsystem responsive to the control signal.

In some examples, the control signal is a first control signal, the OTP control logic is configured generate a second control signal (e.g., MUX SEL in FIGS. 1 and 2) responsive to the acknowledgement, the controller includes a multiplexer (e.g., the multiplexer 140 in FIGS. 1 and 2) coupled to the OTP control logic. In such examples, the multiplexer is configured to: receive the second control signal; and forward data from the OTP control logic responsive to the second control signal. In some examples, the multiplexer is coupled to the write interface firewall, and the multiplexer is configured to receive shared memory requests from the write interface firewall in absence of the first control signal.

Figure 3:
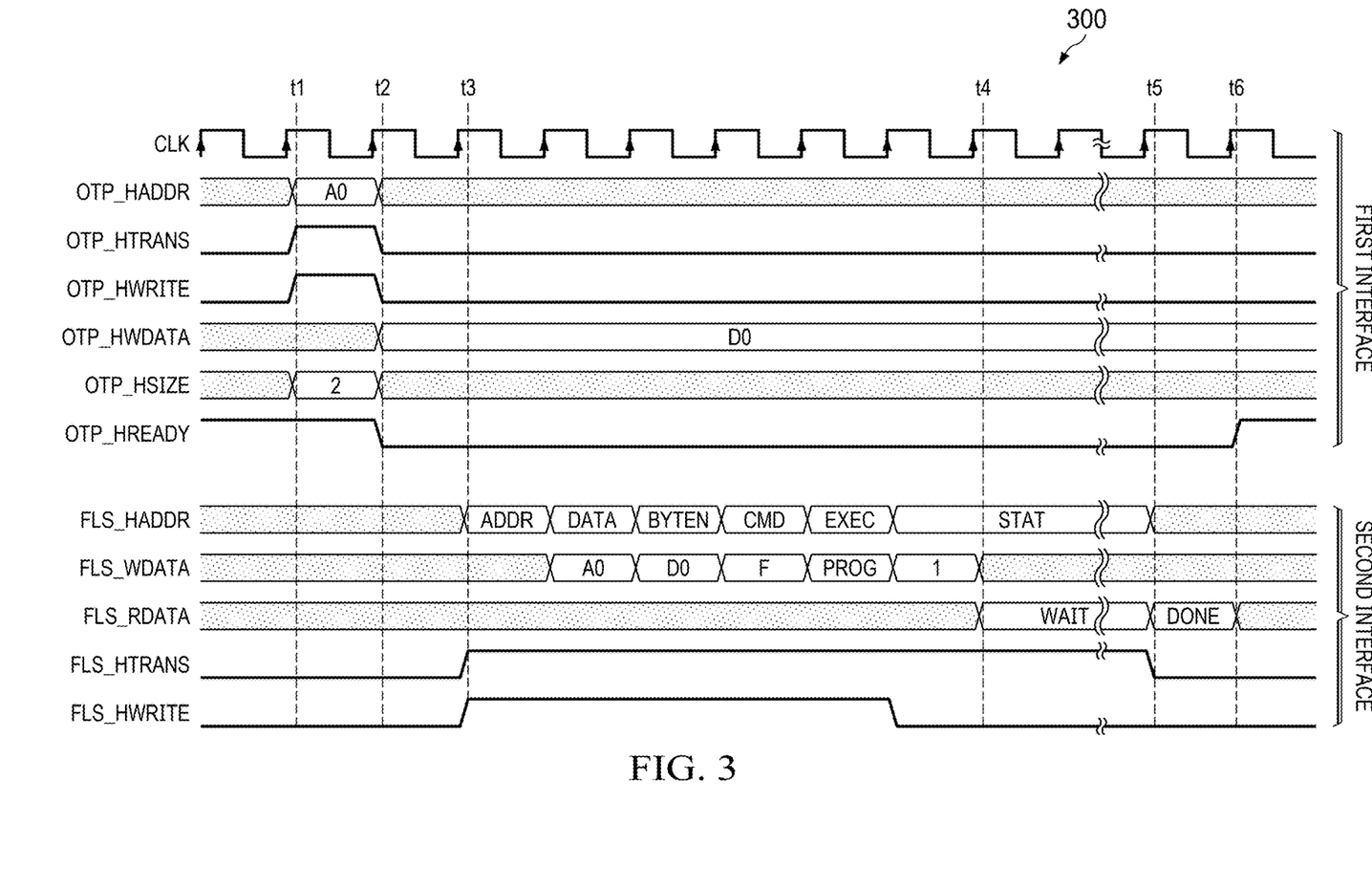
FIG. 3 is a diagram showing example signaling for a first interface and a second interface.

FIG. 3 is a diagram 300 showing example signaling for a first interface (e.g., the first interface 170 in FIGS. 1 and 2) and a second interface (e.g., the second interface 172 in FIGS. 1 and 2). In FIG. 3, the example signaling for the first interface includes CLK, OTP_HADDR, OPT_HTRANS, OTP_HWRITE, OTP_HWDATA, OTP, HSIZE, and OTP_HREADY. CLK is a clock signal used for the first interface. OTP_HADDR is an OTP address provided from the HSM 102 to the controller 110. OTP_HTRANS is provided from the HSM 102 to the controller 110 to indicate the transaction is valid. OTP_HWRITE is an OTP write request provided from HSM 102 to the controller 110. OTP_HWDATA is OTP data related to the OTP write request provided from the HSM 102 to the controller 110. OTP_HSIZE is a size indicator to indicate the amount of data in the OTP write request. OTP_HREADY is an indication from the controller 110 to the HSM 102 that the controller 110 is unavailable or busy.

In FIG. 3, the example signaling for the second interface includes FLS_HADDR, FLS_WDATA, FLS_RDATA, FLS_HTRANS, and FLS_HWRITE. FLS_HADDR is an MMR address provided from the controller 110 to the write interface 156A (e.g., the flash controller 232). FLS_WDATA is MMR write data provided from the controller 110 to the write interface 156A (e.g., the flash controller 232). FLS_RDATA is MMR read data provided from the write interface (e.g., the flash controller 232) to the controller 110. FLS_HTRANS indicates to the controller 110 that the transaction is valid. FLS_HWRITE indicates to the controller 110 that the transaction is a read/write transaction.

At time t1, the HSM 102 starts a new OTP write transaction on the first interface. At time t2, the controller 110 puts the HSM 102 is a wait state by de-asserting OTP_HREADY on the first interface. At time t3, the controller 110 starts a sequence of MMR writes on the second interface to program the specified location in the flash subsystem 150A. At time t4, the controller 110 reads a status register of the write interface 156A via the second interface until OTP write operations are completed by the flash controller 232. At time t5, OTP write operations are indicated to be completed by FLS_RDATA on the second interface. At time t6, the OTP transaction is completed and the first interface is available to start another transaction.

In the example of FIG. 3, the first interface transfers an address (A0) and OTP data (DO). For example, the address and the OTP data may be transferred from the HSM 102 to the controller 110 via the first interface. The second interface transfers the OTP data and the address along with byte enable information, a control command, an execute trigger, and status information. In some examples, the OTP data, the address, the byte enable information, the control command, the execute trigger, and the status information are formatted for the MMRs of the MMR I/F 226 of FIG. 2. In different examples, the number of clock cycles and/or the clock rate for signaling on the first and second interfaces may vary.

Figure 4:
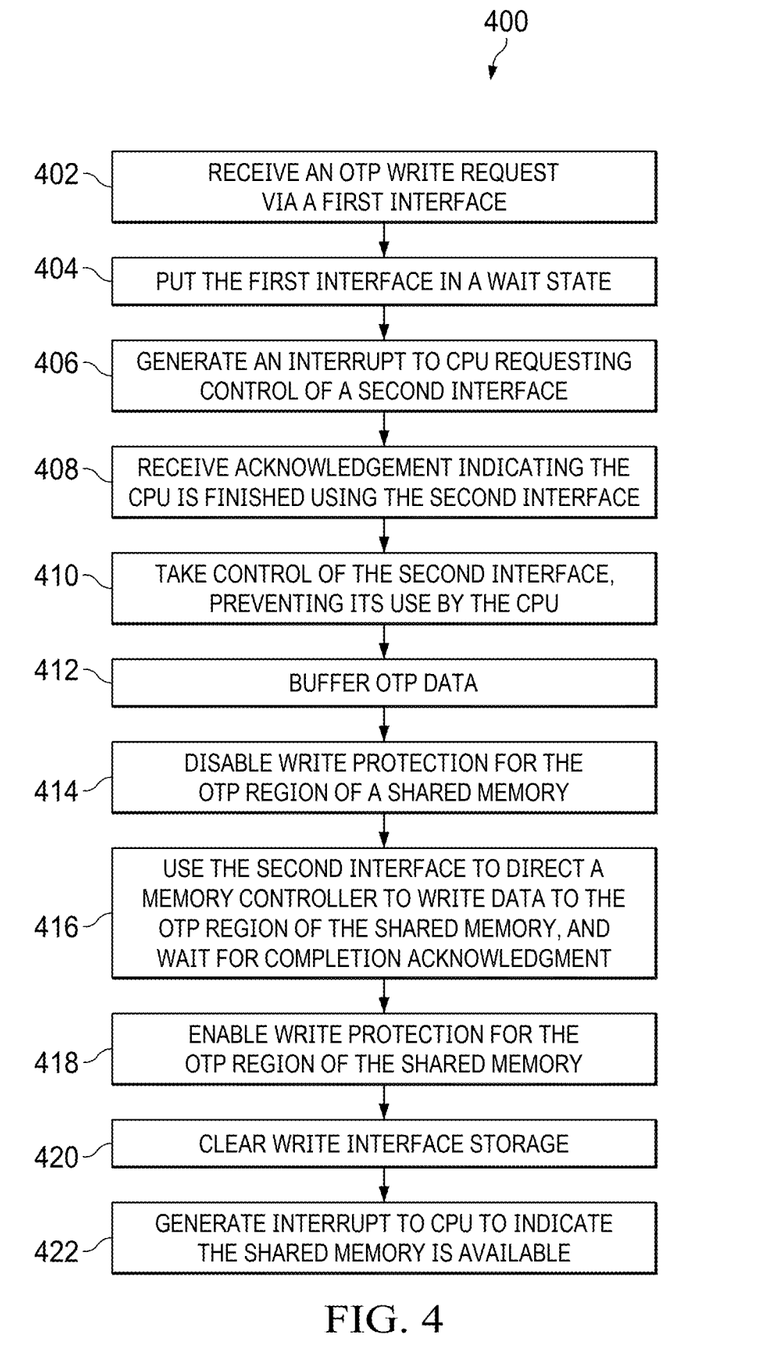
FIG. 4 is a flowchart showing an example OTP control method.

FIG. 4 is a flowchart showing an example OTP control method 400. The OTP control method 400 is performed, for example, by the controller 400 of FIGS. 1 and 2. As shown, the OTP control method 400 includes receiving an OTP write request instruction via a first interface (e.g., the first interface 170 in FIGS. 1 and 2) at block 402. At block 404, the first interface is put in a wait state. At block 406, an interrupt to a CPU (e.g., the processor 106 in FIGS. 1 and 2) is generated requesting control of a second interface (e.g., the second interface 172 in FIGS. 1 and 2). At block 408, an acknowledgement indicating the CPU is finished using the second interface is received. At block 410, control of the second interface is taken, preventing its use by the CPU. At block 412, OTP data is buffered. At block 414, write protection for the OTP region of a shared memory (e.g., a first region of the memory 162 in FIGS. 1 and 2) is disabled. At block 416, the second interface is used to direct a memory controller (e.g., the flash controller 232 in FIG. 2) to write data to the OTP region of the shared memory and wait for a completion acknowledgement. At block 418, write protection is enabled for the OTP region of the shared memory. In some examples, write protection is enabled and disabled as needed using the write I/F firewall 134 in FIG. 2. At block 420, write interface storage (e.g., registers of the MMR I/F 226 or other storage options) is cleared. At block 422, an interrupt to the CPU is generated to indicate the shared memory is available. After block 422 is complete, the second interface is available for shared memory operations.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other examples, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described examples, and other examples are possible, within the scope of the claims.

The invention claimed is:

1. An apparatus comprising:
   a hardware security module;
   a processor;
   a memory subsystem including a write interface and memory, the write interface including storage, the memory including a first region and a second region, the first region being a one-time programmable (OTP) region, and the second region being a shared region;
   a controller between the hardware security module, the processor, and the memory subsystem, wherein the controller is configured to:
      receive an OTP write request from the hardware security module;
      block the processor from accessing the memory subsystem responsive to the OTP write request and an acknowledgment from the processor;
      cause OTP data related to the OTP write request to be written to the first region of the memory;
      clear the storage of the write interface after writing the OTP data is complete; and
      allow the processor to access to the memory subsystem after the storage of the write interface is cleared.

2. The apparatus of claim 1, wherein the controller includes a write interface firewall between the processor and the memory subsystem, the write interface firewall configured to inhibit the providing of shared memory requests by the processor to the write interface during an OTP interval.

3. The apparatus of claim 2, wherein the controller has a terminal, OTP control logic, and a multiplexer, the terminal coupled to the memory subsystem, the multiplexer configured to selectively forward data from the OTP control logic or the write interface firewall to the terminal.

4. The apparatus of claim 1, further comprising a read firewall between the processor and the memory subsystem, the read firewall configured to prevent the processor from making reads to the first region of the memory.

5. The apparatus of claim 1, wherein the hardware security module is configured to initiate the OTP write request responsive to a request from the processor.

6. The apparatus of claim 1, wherein the OTP data includes a cryptographic certificate or key.

7. The apparatus of claim 1, wherein the OTP data includes a monotonic count.

8. The apparatus of claim 1, further comprising:
   a first interface between the hardware security module and the controller;
   a second interface between the controller and the memory subsystem, wherein the controller is configured to:
      receive the OTP data via the first interface using a first communication protocol; and
      provide the OTP data to the memory subsystem via the second interface using a second communication protocol different than the first communication protocol.

9. The apparatus of claim 1, wherein the hardware security module, the processor, the memory subsystem, and the controller are components of a single integrated circuit.

10. The apparatus of claim 1, wherein the hardware security module, the processor, and the controller are components of a first integrated circuit, and the memory subsystem is a component of a second integrated circuit.

11. A circuit comprising:
    a controller adapted to be coupled to a memory subsystem, the controller configured to:
       receive a one-time programmable (OTP) write request;
       block access to the memory subsystem by a processor responsive to the OTP write request;
       cause OTP data related to the OTP write request to be provided to the memory subsystem;
       receive notification that the OTP data has been written to the memory subsystem; and
       allow access to the memory subsystem by the processor responsive to the notification.

12. The circuit of claim 11, wherein the controller includes OTP control logic configured to:
    receive the OTP write request;
    generate a processor interrupt responsive to the OTP write request;
    receive an acknowledgement responsive to the processor interrupt; and
    generate a control signal responsive to the acknowledgement.

13. The circuit of claim 12, wherein the controller includes a write interface firewall, coupled to the OTP control logic, the write interface firewall configured to:
    receive the control signal; and
    block shared memory requests by the processor to the memory subsystem responsive to the control signal.

14. The circuit of claim 13, wherein the control signal is a first control signal, the OTP control logic is configured generate a second control signal responsive to the acknowledgement, the controller includes a multiplexer coupled to the OTP control logic, and the multiplexer is configured to:
    receive the second control signal; and
    forward data from the OTP control logic responsive to the second control signal.

15. The circuit of claim 14, wherein the multiplexer is coupled to the write interface firewall, and the multiplexer is configured to receive shared memory requests from the write interface firewall in absence of the first control signal.

16. A method comprising:
    receiving a one-time programmable (OTP) write request via a first interface;
    blocking shared memory operations by a processor responsive to the OTP write request and an acknowledgment from the processor;
    causing OTP data related to the OTP write request to be written to a first region of a memory via a second interface separate from the first interface;
    clearing storage of a write interface after writing OTP data is complete; and
    allowing shared memory operations by the processor after the storage of the write interface is cleared.

17. The method of claim 16, further comprising:
    putting the first interface in a wait state responsive to the OTP write request; and
    obtaining control of the second interface.

18. The method of claim 17, wherein obtaining control of the second interface includes:
    generating a processor interrupt; and
    receiving acknowledgement from the processor.

19. The method of claim 16, further comprising:
    disabling write protection for the first region of the memory;
    causing the OTP data related to the OTP write request to be written to the first region after the write protection is disabled; and
    enabling write protection for the first region after writing the OTP data to the first region is complete.

20. The method of claim 16, wherein allowing shared memory operations by the processor after the storage of the write interface is cleared includes generating a processor interrupt to indicate shared memory operations are available.

* * * * *